United States Patent Office 3,660,453
Patented May 2, 1972

3,660,453
FLUOROSILICONE HYDRAULIC FLUIDS
Eugene D. Groenhof and Harry M. Schiefer, Midland, Mich., assignors to Dow Corning Corporation, Midland, Mich.
No Drawing. Continuation-in-part of application Ser. No. 564,742, July 13, 1966. This application Jan. 10, 1969, Ser. No. 790,443
Int. Cl. C07f 7/02
U.S. Cl. 260—448.2 R
4 Claims

ABSTRACT OF THE DISCLOSURE

Fluorosilicone fluids of the formula

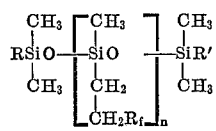

in which

R and R′ are aralkyl radicals containing no more than 3 aliphatic carbon atoms are disclosed as improved hydraulic fluids. Exemplary of such a fluid is 3,3,3-trifluoropropylmethylpolysiloxane having a viscosity of 40 cs. at 77° F. which is endblocked with 2-phenylethyldimethylsiloxy units.

---

This application is a continuation-in-part of application Ser. No. 564,742, filed July 13, 1966, and now abandoned.

This application relates to hydraulic fluids which exhibit improved performance over the known fluorosilicone fluids such as trimethylsiloxy-endblocked 3,3,3-trifluoropropylmethylpolysiloxane.

For use in high altitude aircraft, hydraulic fluids must have a very low pour point, i.e., remain fluid at very low temperatures. In addition, these fluids must have a certain low degree of compressibility to avoid waste of energy in power transmission. The fluids must also have lubricity, be stable at high temperatures and be relatively inflammable. Known fluorosilicone fluids, such as trimethylsiloxane-endblocked 3,3,3 - trifluoropropylmethylpolysiloxane, possess many of these desirable properties, but are restricted to use in less severe environments because of a relatively high pour point.

The hydraulic fluids of this invention have less compressability, a higher ignition temperature, and generally equal or improved lubricity when compared with the above known organopolysiloxanes. The fluids of this invention are also particularly susceptible to having their lubricity improved by means of the addition of a small amount of an organophosphorus additive such as dioctyl phosphite or tricresyl phosphate to form fluids having outstanding lubricity. The organophosphorus additives are also easily dissolved in the fluids.

Accordingly, it is an object of the invention to provide an improved fluorosilicone fluid.

Another object of the invention is to modify the structure of known fluorosilicone fluids to obtain improved low temperature properties while retaining the other desirable characteristics.

These and other objects of the invention will be apparent to one skilled in the art upon consideration of the following specification and appended claims.

More particularly, the invention relates to a fluid consisting essentially of at least one organopolysiloxane of the formula

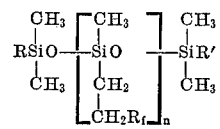

in which

R and R′ are aralkyl radicals containing no more than 3 aliphatic carbon atoms,
$R_f$ is a perfluoroalkyl radical of no more than 8 carbon atoms, and
$n$ is so selected to yield a polymer having a viscosity at 77° F. of 20 to 500 cs.

The unexpected discovery of this invention is that the addition of aralkyl-containing groups to the endblocks of fluorosilicone fluids results in a marked improvement in several properties, rendering the fluid more suitable for use as a lubricating oil or a hydraulic fluid, particularly at high temperatures. It is further unexpected that these fluids have very low temperature pour points despite the addition of the aralkyl groups.

R and R′ can each be an aralkyl radical such as benzyl or 2-phenylpropyl; 2-phenylethyl, 3-phenylpropyl, 2-tolylethyl and the like. $R_f$ can be any perfluoroalkyl radicals as defined above, e.g. trifluoromethyl, perfluoroisobutyl, prefluorohexyl, and perfluorooctyl.

The organopolysiloxanes used herein are easily prepared through the known techniques of organosilicon chemistry, such as that disclosed in U.S. Pat. 2,961,425. The viscosity of the product is easily controlled by controlling the concentration of endblocking-groups present during the preparative process, which usually consists of reacting a cyclic trimer with disiloxane endblocking material. An alternative method involves addition of aryl-containing vinyl compounds to SiH-containing fluorosilicone fluids. For example, the reaction of vinyltoluene with dimethylhydrogensiloxy-endblocked - 3,3,3-trifluoropropylmethylpolysiloxane in the presence of chloroplatinic acid produces a fluid of the invention. Generally $n$ has a value of from 3 to 70.

The following example is illustrative only and should not be construed as limiting the invention, which is properly delineated in the appended claims.

EXAMPLE 1

The following fluids within the scope of the invention were tested:

Fluid A: 3,3,3 - trifluoropropylmethylpolysiloxane having a viscosity at 77° F. of 40.4 cs. and having 2-phenylethyldimethylsiloxane endblocks.

Fluid B: 3,3,3 - trifluoropropylmethylpolysiloxane having a viscosity at 77° F. of 79.4 cs. and having 2-tolylethyldimethylsiloxane endblocks.

Fluid C: 3,3,3-trifluoropropylmethylpolysiloxane having a viscosity at 77° F. of 46.4 cs. and having 2-phenylpropyldimethylsiloxane endblocks.

For purposes of comparison the following fluids were also tested:

Fluid D: 3,3,3-trifluoropropylmethylpolysiloxane having a viscosity at 77° F. of 52.8 cs. and having endblocks consisting of 67 mol percent of diphenylmethylsiloxane and 33 mol percent of phenyldimethylsiloxane.

Fluid E: 3,3,3-trifluoropropylmethylpolysiloxane having a viscosity at 77° F. of 46.7 cs. and having endblocks consisting of 45 mol percent of diphenylmethylsiloxane and 55 mol percent of phenyldimethylsiloxane.

Fluid F: 3,3,3-trifluoropropylmethylpolysiloxane having a viscosity at 77° F. of 106 cs. and having phenylmethyl-3,3,3-trifluoropropylsiloxane endblocks.

Fluid G: A trimethylsiloxane - endblocked 3,3,3 - trifluoropropylmethylpolysiloxane having a viscosity at 77° F. of 100 cs.

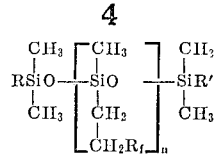

in which

|  | Fluid | | | | | | |
|---|---|---|---|---|---|---|---|
|  | A | B | C | D | E | F | G |
| Pour point, ° F | −94 | −87 | −90 | −70 | −76 | −58 | −70 |
| Specific gravity (25° C.) | 1.169 | 1.171 | 1.150 | 1.179 | 1.185 | 1.251 | 1.220 |
| Compressability at 20,000 p.s.i. (percent) | 6.68 | 6.57 | 6.45 | 6.13 | 6.35 | 6.45 | 7.45 |
| Auto ignition temperature (° F.) (ASTM D-286): |  | 920 | 976 | 940 | 940 | 983 | 850 |
| Shell 4-ball test 400° F. 1,020 r.p.m., ½ hr. 20 kg., scar diam. (mm.) | 0.67 | 0.79 | 0.86 | 0.72 | 0.76 | 0.80 | 0.80 |
| Same 4-ball test with 1% tricresyl phosphate | 0.57 | 0.35 | 0.34 | 0.45 | 0.50 | 0.35 | 0.67 |

Mineral oil, when subjected to these same tests, shows a compressibility of approximately 6.1%, an Auto-ignition temperature of about 700° F. and a pour point of about −30° F.

It is apparent from the data, that fluids A, B and C having pour point of approximately −90° F. are uniquely suitable as hydraulic fluids for use in severe environments. The relatively low degree of compressibility has been retained and the fluid does not readily burn. The fluid which contains the phosphate additive exhibits significant increase in lubricity.

It is also apparent that the fluids (A, B and C) of the invention possess superior properties to known fluorosilicone fluids, such as Fluids D, E, F and G. These fluids, tested for comparison, do not exhibit the desirable low temperature properties and would not be suitable for use in certain types of environment.

It is within the scope of the invention to provide a method of transmitting power comprising applying pressure to the fluids of the invention which are confined in a hydraulic system. Other reasonable modification and variation are within the scope of the invention.

That which is claimed is:

1. A fluid having a pour point of approximately −90° F. consisting essentially of at least one organopolysiloxane of the formula R and R′ are aralkyl radicals containing no more than 3 aliphatic carbon atoms;

$R_f$ is a perfluoroalkyl radical of no more than 8 carbon atoms; and $n$ is so selected to yield a polymer having a viscosity at 77° F. of 20 to 500 cs.

2. The fluid of claim 1 wherein R and R′ are 2-phenylpropyl radicals and $R_f$ is a trifluoromethyl radical.

3. The fluid of claim 1 wherein R and R′ are 2-phenylethyl radicals and $R_f$ is a trifluoromethyl radical.

4. The fluid of claim 1 wherein R and R′ are 2-tolylethyl radicals and $R_f$ is a trifluoromethyl radical.

References Cited

UNITED STATES PATENTS

| 2,961,425 | 11/1960 | Pierce et al. | 260—448.2 X |
| 3,006,878 | 10/1961 | Talcott | 260—448.2 X |
| 3,267,031 | 8/1966 | Buehler | 260—448.2 X |
| 3,317,429 | 5/1967 | Cekada et al. | 260—448.2 X |

TOBIAS E. LEVOW, Primary Examiner

W. F. W. BELLAMY, Assistant Examiner

U.S. Cl. X.R.

252—78, 77, 75